United States Patent [19]

Migrin et al.

[11] 4,254,312
[45] Mar. 3, 1981

[54] TEMPERATURE COMPENSATED FILL VALVE/PRESSURE SWITCH

[75] Inventors: Robert S. Migrin, Dearborn; James M. Brown, Allen Park, both of Mich.

[73] Assignee: Eaton Corporation, Cleveland, Ohio

[21] Appl. No.: 974,284

[22] Filed: Dec. 29, 1978

[51] Int. Cl.³ .............................................. H01H 35/24
[52] U.S. Cl. ................. 200/61.25; 73/146.8; 337/120
[58] Field of Search ............... 200/61.25, 81 R, 83 P, 200/61.22; 73/146.5, 146.8; 337/120; 340/58

[56] References Cited
U.S. PATENT DOCUMENTS

| 3,487,348 | 12/1969 | Linsalato | 337/320 |
| 3,743,801 | 7/1973 | Brobeck et al. | 200/61.25 |
| 3,889,077 | 6/1975 | Hayashi | 200/83 P |
| 3,908,105 | 9/1975 | Schuler | 200/61.25 |
| 4,117,281 | 9/1978 | Leimbach | 200/61.25 |
| 4,177,671 | 12/1979 | Ichihara et al. | 73/146.5 |
| 4,181,831 | 11/1980 | Mayer et al. | 200/61.25 |

Primary Examiner—J. V. Truhe
Assistant Examiner—Morris Ginsburg
Attorney, Agent, or Firm—R. J. McCloskey; D. Wood; J. G. Lewis

[57] ABSTRACT

A device for filling a pneumatic tire and sensing the air pressure therein has a check valve disposed within a valve stem and a pressure sensing switch which is temperature compensated to adjust for air pressure changes within the tire due to changes in ambient temperature. Substantially perfect compensation can be achieved, within a limited range of operation, whereby the set point pressure versus temperature characteristic will track with the related tire pressure versus temperature characteristic. A manual set point adjustment feature is provided whereby the switch can be calibrated after it is assembled within a wheel and pneumatic tire. The switch can also be employed independently of, as well as in conjunction with, the check valve.

31 Claims, 7 Drawing Figures

TEMPERATURE COMPENSATED FILL VALVE/PRESSURE SWITCH

INTRODUCTION

This invention relates to apparatus for pressurizing containers and monitoring the fluid pressure level therein and specifically to integrated fill valves and pressure switches for use with pneumatic tires.

CROSS REFERENCES

In certain respects, the present invention relates to the subject matter of application Ser. No. 775,663 filed Mar. 8, 1977, now U.S. Pat. No. 4,117,281 issued Sept. 26, 1978.

BACKGROUND OF THE INVENTION

It will be apparent from a reading of the specification that the present invention may be advantageously utilized with pressurized containers and vessels intended for many different applications. However, the invention is especially useful when applied to motor vehicle pneumatic tires, and will be described in connection therewith.

A number of pneumatic tire fill valves which include pressure sensing devices have been suggested by the prior art. Typically, such valves have been employed in tire pressure monitors in which a valve is associated with each tire to monitor the air pressure therein and to close or open an electrical switch, thereby actuating a radio transmitter, when the fluid pressure within one of the tires falls below a predetermined level. Frequently, mechanical pop-out or other attention attracting devices have been incorporated within the valve to eliminate the need for interfacing the low tire condition information between the tire and vehicle body.

Prior art schemes frequently have undesirable characteristics in certain applications. The most significant shortcoming of prior art devices is their inability to compensate for temperature variations in the surrounding atmosphere. This is particularly important in applications with pneumatic tires inasmuch as the temperature of the fluid or air within the tire varies over an extremely large range due to heat generated during operation as well as ambient temperature changes, which results in the pressure within the tire also varying greatly. Prior art units merely compare the pressure within the tire with ambient or atmospheric pressure. If the unit has a single pressure set point at which the valve actuates its warning mechanism, the effective calibration will vary with temperature and pressure. This vibration can be so extreme that a tire, filled to its recommended limit during a relatively hot day or after prolonged operation, can give a false low pressure condition signal due entirely to cooling of the atmosphere.

An additional shortcoming of commercially available valves is the inability of the user to manually calibrate or vary the set point once the valve has been installed in the vehicle wheel. This inability results in tire pressure monitors which may have substantially different set points from wheel to wheel. Finally, valves having electrical switches incorporated therein typically provide for interconnection with the rest of the tire pressure monitoring circuit by dressing leads radially outwardly from valve stem. Because of the harsh environment found in a typical automotive wheel, these leads can deteriorate over time and result in either a false low tire condition signal being generated or an open circuit in which no signal will be generated even if such a condition occurs. The commercial units which have been provided to overcome this shortcoming have proven to be extremely expensive and impractical for passenger vehicle application.

BRIEF DESCRIPTION OF THE INVENTION

The present invention relates to a device for monitoring fluid pressure within a pressurized container such as a pneumatic tire. The invention device includes a switch which changes from one state to another when the fluid pressure within the container falls below a selected level, and compensation means which vary the selected level as a function of fluid temperature. This arrangement has the advantage of providing a switch device which is temperature compensated to negate the effects the ambient temperature changes upon the switch pressure calibration.

According to an aspect of the invention, the device also includes a valve disposed within an inlet passage to selectively pass fluid through the passage to the container. This arrangement has the advantage of providing an improved compact device which operates to both pressurize and monitor fluid pressure within the container.

According to another aspect of the invention, the device has adjustment means disposed within the inlet passage between the valve and the switch. This provides the advantage of permitting manual calibration of the device after installation by affording access to the adjustment means through the inlet passage.

According to another aspect of the invention, the compensation means comprises a substantially closed chamber located in the body and having a volume which varies as a function of the fluid pressure within the container. This arrangement has the advantage of providing substantially exact compensation due to temperature changes within the container. In an alternative embodiment, a bimetallic element is substituted for the close chamber which provides a degree of compensation at reduced cost.

According to still another aspect of the invention, the body includes a valve stem which defines the inlet passage. The valve stem is constructed, at least in part, of conductive material and comprises a terminal which is electrically connected to the switch and provides an electrical terminal as well as structural support for the valve. This arrangement has the advantage of eliminating electrical leads or wires.

These and other features and advantages of this invention will become apparent upon reading the following specification, which, along with the patent drawings, describes and discloses a preferred illustrative embodiment of the invention in detail.

The detailed description of the specific embodiments makes reference to the accompanying drawings.

DETAILED DESCRIPTION OF THE SPECIFIC EMBODIMENTS

Although the specific embodiments of the invention which are described hereinbelow include the combination of a temperature compensated switch and pneumatic tire fill valve, it is to be understood that the present invention, in its broadest sense, contemplates only the temperature compensated switch. As will be obvious to one skilled in the art upon reading this specification, the switch and valve can be embodied separately without departing from the spirit of the present invention.

Figure 1:
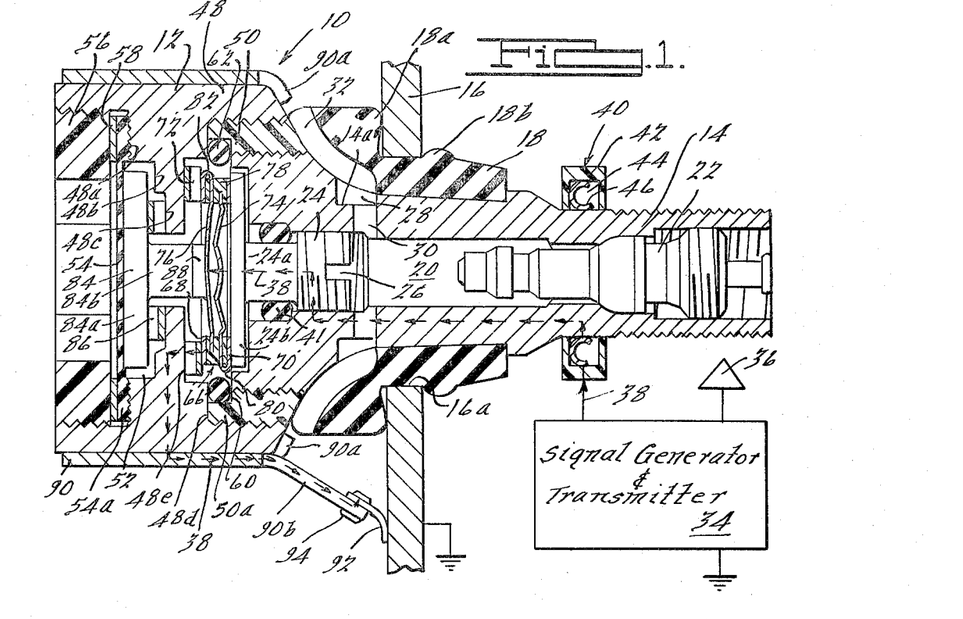
FIG. 1, is a cross sectional view of the preferred embodiment of the invention, illustrating its application in a low tire pressure monitor system.

Referring to FIG. 1, a preferred embodiment of a temperature compensated fill valve/pressure switch (valve-switch) 10 is illustrated. Valve-switch 10 has a body comprising a switch housing portion 12 and a valve stem portion 14. Valve-switch 10 is insulatively mounted to a wheel 16 through an intermediate rubber mounting grommet 18. Wheel 16 is supportive of a pneumatic tire (not illustrated) in the conventional manner, switch housing portion 12 being disposed within a cavity defined by the tire and wheel 16 with valve stem portion 14 projecting outwardly through an aperture 16a in wheel 16. The right-handmost end of valve stem portion 14 is thus accessible when valve-switch 10 is used in application with a motor vehicle or the like. Although the present invention is being described in application with a motor vehicle having a conventional pneumatic tire, it is contemplated that valve-switch 10 could be applied to other pressurized containers or vessels.

Grommet 18 defines two areas of increased diameter 18a and 18b which are spaced from one another and straddle wheel 16, preventing axial displacement of valve-switch 10 with respect thereto. Valve-switch 10 is employed to pressurize the tire by providing a path of fluid communication between the atmosphere and the cavity defined by the tire and wheel 16. Valve stem portion 14 has an axial bore 20 therethrough. A valve core assembly 22 is threadably disposed within bore 20 in the usual manner and operates to admit pressurized air into the tire but check its escape therefrom. Inasmuch as its operation is well known in the art, the structural details of valve core assembly 22 are deleted here for the sake of brevity.

The inner end of bore 20 is closed by a set-point adjustment screw 24 threadably disposed therein. The surface of set-point adjustment screw 24 which faces valve core assembly 22 has a tool receiving slot 26 formed therein. Proximate the innermost end of bore 20, the circumferential surface of valve stem portion 14 has an area of reduced diameter 14a which defines an annular air inlet passage 28 which communicates with bore 20 through radially disposed inlet bores 30. Air inlet passage 28 also communicates with the cavity defined by the tire and wheel 16 through a relief 32 formed in the radially innermost portion of grommet 18. Valve-switch 10 therefore defines an inlet passage 28 and relief 32. Valve core assembly 22 acts as a check valve, whereby air can be forced inwardly therethrough to pressurize the tire and wheel 16 but escape of air therefrom is prevented. Rubber grommet 18 serves to electrically isolate valve-switch 10 from wheel 16 as well as to form an airtight seal between the two. Valve stem portion 14 is constructed of brass or other suitable conductive metal and serves as an electrical terminal as well as a structural support member for valve core assembly 22.

In application, valve-switch 10 establishes a set-point pressure. When the air pressure within the tire exceeds the set-point pressure, valve stem portion 14 is electrically connected to ground through wheel 16 and when the air pressure within the tire falls below the set-point pressure, valve stem portion 14 is electrically insulated from ground. The logic arrangement is generally an engineering expedient and can be reversed, depending upon the desired application. In FIG. 1, valve-switch 10 is illustrated as being applied with a tire pressure monitor having a signal generator and transmitter 34 associated with wheel 16 which operates to transmit an RF signal from an antenna 36 when the air pressure within the tire and wheel 16 falls below the set-point pressure. When this occurs, a path to ground indicated generally at 38 is opened and a signal is emitted from antenna 36 to a remote receiver (not illustrated) which serves to warn the operator of a low tire condition. Path to ground 38 includes a connector 40 which matingly engages the outer surface of valve stem portion 14. Connector 40 comprises an insulator 42 which is substantial u-shaped in cross section, opening radially inwardly to define a cavity 44. A substantially torrodial spring contact 46 is disposed within cavity 44 which provides a path of electrical conductivity between signal generator and transmitter 34 and valve switch 10. Connector 40 is retained from outward axial displacement from the position illustrated by conventional dust cap (not illustrated) which is threadably disposed upon the outsidemost end of valve stem portion 14. Thus, no wires or external leads need be routed from valve-switch 10 and interconnection of signal generator and transmitter 34 merely requires insertion of connector 40 over valve stem portion 14 and replacement of the dust cover. It is to be understood that the low tire pressure monitor described hereinabove is illustrative in nature and that valve-switch 10 can be adapted for many other and diverse applications.

Set-point adjustment screw 24 has an area of reduced diameter 24a which extends inwardly, terminating in a switch supporting platform portion 24b. Adjustment screw 24 is integrally formed of electrically conductive material such as brass. An o-ring seal 41 is disposed between area of reduced diameter 24a and valve stem portion 14. O-ring 41 is sized so it will remain in sealing engagement with valve stem portions 14 and adjustment screw 24 while adjustment screw is being axially displaced during rotational adjustment thereof.

Switch housing portion 12 comprises a housing member 48 which threadably engages the left-handmost end of valve stem portion 14 through an intermediate insulating sleeve 50. Housing member 48 is constructed of electrically conducting metal such as brass and sleeve 50 is constructed of electrically insulating material such as plastic or other suitable structurally rigid material. Housing member 48 has a stepped bore 52 passing therethrough coaxially with bore 20 of valve stem portion 14.

As viewed from left to right in FIG. 1, bore 52 defines three axially spaced discrete steps 48a, 48b and 48c which are of progressively reduced diameter respectively. Land 48a defines a plurality of concentric serrations which sealingly abut the radially outwardmost portion of a rubber diaphragm 54. Diaphragm 54 has a circumferential area of increased thickness 54a. Diaphragm 54 is retained by an externally threaded nut 56 and intermediate washer 58. Washer 58 is constructed of a suitable metal and nut 56 is constructed of plastic or the like. Diaphragm 54 thus closes the left-handmost end of bore 52.

Bore 52, viewed from right to left, defines two axially spaced lands 48d and 48e having discretely reduced diameters respectively. The left-handmost end of sleeve 50 has an extended portion 50a which abuts land 48d, which, with extension portion 50a, defines an inwardly opening annular slot 60 which receives an o-ring seal 62. O-ring seal 62 seals the joints between insulator 50 and valve stem portion 14 as well as insulator 50 and housing member 48. Thus, bore 52 comprises a sealed cavity which is defined by housing member 48, diaphragm 54, valve stem portion 14, set-point adjustment screw 24 and o-ring 41 and 62. This cavity will hereinafter be referred to as the switch cavity.

A switch assembly, generally designated 64, is disposed within the switch cavity and comprises a snap-action disc switch 66 interposed between two washers 68 and 70 which are constructed of electrically conductive metal. The right-handmost surface of washer 70 abuts the left-handmost surface of switch support platform portion 24b of adjustment screw 24. Switch assembly 64 is retained in the illustrated position by a wave spring 72 which abuts the left-handmost edge of washer 68 and bears against land 48e of housing member 48, urging switch assembly 64 to the right. Disc switch 66 is of standard construction and is readily commercially available. The switch illustrated is manufactured by IEE/Shadow Inc. a subsidiary of ITT, which is designated disc module model ED. However, it is contemplated that any member of commercially available switches can be substituted therefor.

Disc switch 66 comprises two disc shaped contacts 74 and 76 which are supported by an insulating washer 78. Under normal conditions, contacts 74 and 76 are spaced and electrically insulated from one another. Contact 74 is electrically connected to washer 70 through an integral conducting bridge 80 and contact 76 is electrically connected to washer 68 through an integral conducting bridge 82. A plunger 84 comprises an integral flange 84a abuts the right-handmost surface of diaphragm 54. Plunger 84 is constructed of plastic or other suitable material and is retained in the illustrated position by a wave spring 86 which abuts land 48c of housing member 48 and bears against the right-handmost surface of flange 84a. As illustrated in FIG. 1, wave spring 86 is in its preloaded or neutral position. Plunger extension portion 84b abuts the left-handmost surface of contact 76 through a protecting insulating disc 88. The operation of disc 66 switch is well known in the art and will not be elaborated upon here. The switch was chosen for its characteristically fast and positive switching action, but it is contemplated that other types of switches could be substituted in its place.

Grounding with wheel 16 is accomplished by a grounding bracket sleeve 90 which is pressed over the outside surface of housing member 48. Sleeve 90 is secured to housing member 48 by integral tabs 90a which are bent inwardly to embrace the contours of housing member 48. An integral finger member 90b extends from grounding bracket sleeve 90 towards wheel 16 and terminates in a contact spring 92 which depends therefrom in a cantilever fashion and is secured thereto by means of a rivet 94 or other suitable fastening means. The free end of contact spring 92 bears against wheel 16, establishing a ground path therewith. For the purposes of the example of FIG. 1, it is assumed that wheel 16 is grounded with respect to signal generator and transmitter 34.

Figure 2:
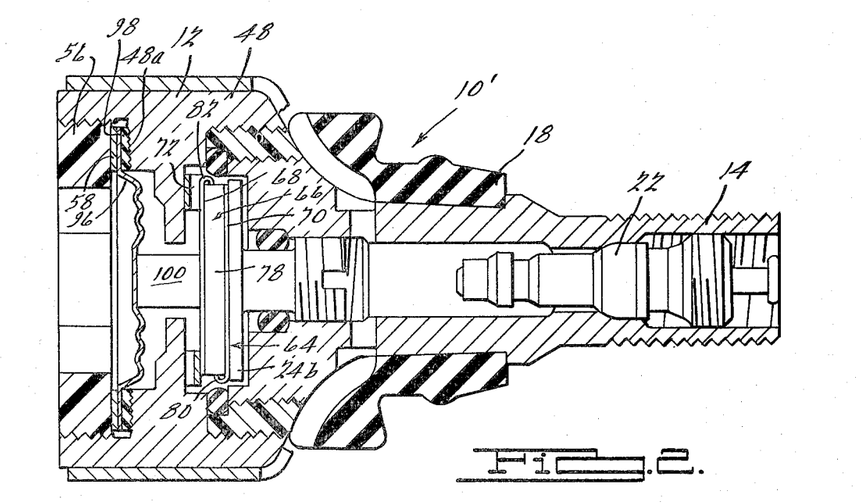
FIG. 2, is a cross sectional view of an alternative embodiment of the valve/switch of FIG. 1.

Referring to FIG. 2, an alternative embodiment of the invention is illustrated. A valve-switch 10' operates and is constructed in the same manner as the embodiment of FIG. 1 with the following exceptions. A thin metal diaphragm 96 is mounted along its peripheral edge by nut 56, washer 58, and an annular rubber gasket 98 disposed intermediate diaphragm 96 and land 48a of housing member 48. The diaphragm is constructed of thin, non-ferrous metal and has a cross section characterized by concentric undulations. The central right-handmost surface of diaphragm 96 is affixed to a plunger 100 such as by ultrasonic welding or the like. The right-handmost surface of plunger 100 bears against a switch contact within disc switch 66 as described in the discussion on the embodiment of FIG. 1. Plunger 100 is constructed of plastic or other suitable material.

OPERATION

Valve-switch 10, illustrated in FIG. 1, operates as follows. In application, switch housing portion 12 is disposed within the cavity defined by the tire and wheel 16. The air pressure within the tire is typically elevated above that of atmospheric pressure which will result in a force being applied against the left-handmost surface of diaphragm 54 which will tend to displace plunger 84 to the right. Displacement of plunger 84 to the right will deflect contact 76 to the right creating an electrical connection with contact 74. Contact 74 is also compliant to the extent that any additional travel of plunger 84 will cause the abutting contacts 74 and 76 to move further to the right while retaining electrical connection therebetween. Assuming therefore that the set-point pressure is 15 p.s.i.g. (GAGE pressure) and the air pressure within the tire is 30 p.s.i.g., contacts 74 and 76 will complete the path to ground 38 which comprises spring contact 46, valve stem portion 14, adjustment screw 24, washer 70, bridge 80, contacts 74 and 76, bridge 82, washer 68, wave spring 72, housing member 48, ground bracket sleeve 90, finger member 90b, contact spring 92 and finally wheel 16. Disc switch 66 will remain in the closed position until the air pressure in the tire falls below set-point pressure.

The temperature compensation feature of the present invention is accomplished in the embodiment of FIG. 1 by the sealed switch cavity and wave spring 86. The pneumatic tire, in typical application, is subject to a wide range of ambient temperature conditions and, being itself a sealed cavity, will vary through a large range of pressures. It is conceivable that a tire could be filled to its recommended pressure level during a hot day, and later on a reduced ambient air temperature would cause the pressure within the tire to fall below the set-point pressure, thereby triggering a false or erroneous low tire condition signal. The object of the compensation therefore is to counter and negate the effects of ambient temperature changes upon the set-point pressure or calibration of valve-switch 10. In other words, a compensation scheme will effectively vary the set-point pressure as a function of temperature.

Manual calibration of valve-switch 10 is accomplished by removal of valve core assembly 22 and deflation of the tire and wheel 16 to one atmosphere and engaging slot 26 within adjustment screw 24 with a suitable tool such as a screwdriver. By rotating screw 24, switch support platform portion 24b can be axially displaced. Switch assembly 64 is also displaced along with adjustment screw 24. If adjustment screw 24 is backed off, for example, and displaced axially rightwardly, the result will be to increase the set-point pressure because a larger force will need be applied to diaphragm 54 to further displace plunger 84 to take up the additional distance vacated by adjustment screw 24. Likewise, rotating adjustment screw 24 to displace it leftwardly, will effectively lower the set-point pressure. Once the recalibration procedure is complete, valve core assembly 22 is replaced and the tire is reinflated. With this feature, the vehicle operator can readily calibrate each valve-switch 10 on the vehicle to the same set-point pressure level.

Figures 5, 6:
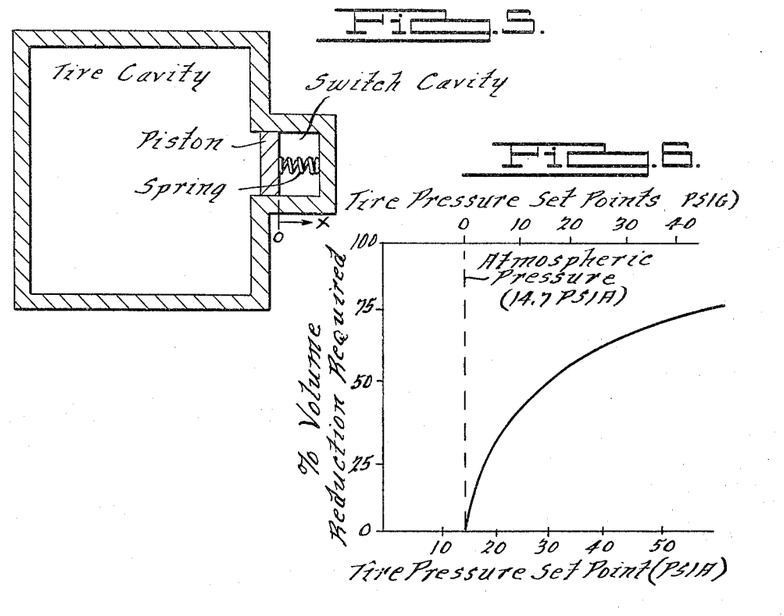
FIG. 5, is a sectional view of a mathematical model, illustrating the compensating operation principles of the valve/switches of FIGS. 1 and 2.
FIG. 6, is a graphical presentation of the percentage switch cavity volume reduction required versus tire pressure set point for the mathematical model of FIG. 5.

Referring to FIG. 5, a simplified model of the tire and valve-switch 10 is presented to further explain the temperature compensation aspect of the invention. The cavity defined by the tire and wheel 16 is assumed herein to be constant and having a characteristic pressure ($P_t$) volume ($V_t$) and temperature ($T_t$). The switch cavity within valve-switch 10 is also sealed and has a characteristic pressure ($P_s$), temperature ($T_s$) and volume ($V_s$). The volume ($V_s$) of the switch cavity, however, is a variable depending upon the position of a piston having a characteristic area ($A_p$). The piston of FIG. 5 is the equivalent of diaphragm 54 and plunger 84 in FIG. 1 and is illustrated in its rest or pressure equalized position. It is also assumed that sealing is perfect and there is no leakage by the piston between the tire cavity and switch cavity. The actual linear displacement of the piston is designated as X in FIG. 5. Also included is a spring disposed within the switch cavity which opposes rightward displacement of the piston. This spring is the equivalent of the wave spring 86 in FIG. 1. For the purposes of this model the spring has a characteristic spring rate ($K_s$). Finally, although the volume ($V_s$) of the switch cavity is treated as a variable, the volume of the tire cavity ($V_p$) is so much larger it will be treated as a constant irrespective of the displacement of the piston.

Applying the well known ideal gas law, for a constant volume container subject to a temperature change, the new pressure is equal to the old pressure times the ratio of the absolute temperatures. For any given static situation, the system of FIG. 5 will be in equilibrium and, looking at the piston as a free body, neglecting frictional effects, the summation of the forces acting thereon will be equal to zero. Accordingly, the force component resulting from the tire cavity pressure ($P_t$) will be balanced by the force component resulting from switch cavity pressure plus the force applied by the spring. Therefore:

$$(P_t)(A_p) = (P_s)(A_p) + (K_s)(X) \tag{1}$$

When valve-switch 20 is first assembled, ($P_t$) equals ($P_s$) which equals atmospheric pressure.

Additionally, the piston will be in its rest position and (X) will equal zero. When the switch is calibrated, ($P_t$) increases to the set-point pressure and the piston moves to the right as shown in FIG. 5. The piston displacement causes both the switch volume and the tire volume to change such that the switch volume will decrease an amount equal to the amount which the tire volume will increase. In terms of a percentage change in volume, however, the tire volume will remain approximately constant and the switch volume will not. The change in the switch volume will be a complex function involving the piston displacement (X) and the cavity geometry. As a result of this complex relationship, it is easier to refer to the change in volume in terms of a percentage of the original (%V). Accordingly, the switch cavity volume resulting from a diaphragm deflection ($V_{s2}$) will equal the original switch volume ($V_{s1}$) times the percentage of the remaining volume or $$V_{s2} = (1 - \%V)(V_{s1}) \tag{2}$$

The decrease in trapped volume will result in an increase in cavity pressure as determined by the ideal gas law where the P*V/T relationship holds constant under steady state conditions at all temperatures. Assuming that the temperatures remain the same, and solving for the trapped pressure ($P_{s2}$) which will respond to temperature changes:

$$P_{s2} = P_{s1}/(1 - \%V) \tag{3}$$

During switch calibration, the pressure in the cavity increases to ($P_{s2}$) as defined by equation 3. The piston (or plunger) deflection is defined by equation 1 to be:

$$X_s = (P_t - P_{s2})(A_p)/K_s \tag{4}$$

or in terms of ($P_{s1}$) and volume reduction:

$$X_s = \frac{[P_t - [P_{s1}/(1 - \%V)]] (A_p)}{K_s} \tag{5}$$

With the tire inflated to the correct level, ($X_s$) must remain constant over all temperature ranges. In order for ($X_s$) to remain constant while the temperature is varied, ($P_t$) and ($P_{s2}$) must be equal at all times (for 100% temperature compensation). In other words, during calibration $$P_t = P_{s1}/(1 - \%V) \tag{6}$$

This requires that the sealed switch volume be reduced to a point that the trapped pressure equals the switch point tire pressure. This condition will make the spring nonfunctional as ($X_s$) equals zero and the force balance on the diaphragm is achieved through the action of the pressure on either side of the diaphragm. By observation of equation 6, it can be seen that the percent volume reduction required to achieve total pressure compensation depends upon tire pressure set-point ($P_t$) and the assembly pressure ($P_{s1}$). Solving equation 6 for the percent volume reduction with ($P_{s1}$) equaling 14.7 p.s.i.a., the graph of FIG. 6 can be generated which shows the required volume reduction at various tire pressure set-points assuming ($P_{s1}$) is 14.7 p.s.i.a.

$$\%V = 1 - P_{s1}/P_t \tag{7}$$

If the volume is not reduced to the point where total pressure compensation is achieved, the pressure set-point will not follow the tire pressure as the temperature increases. However, as long as it remains a sealed switch cavity, some temperature compensation will exist. Although total temperature compensation is the ideal, engineering experience may dictate partial temperature compensation for cost or other reasons. Accordingly, it is contemplated that compensation means, as used in the claims, refers to any amount of temperature compensation and not merely total temperature compensation.

Partial temperature compensation can be best explained in terms of an example. The sealed cavity pressure will remain a function of the volume reduction (see equation 3) and the set-point deflection is still defined by equation 5. If the temperature within the sealed cavity were to increase and the position of $(X_s)$ were maintained (constant sealed volume), the sealed cavity pressure would increase according to the relationship given hereinabove, i.e., the increased pressure would be equal to the first pressure times the ratio of the absolute temperature. At this point it is convenient to assume that the tire pressure could be adjusted to maintain the piston set-point deflection of $X_s$ ($X_s$ is constant). This assumption allows the problem to be worked in reverse in order to solve for the tire pressure required to reach this deflection. This new tire pressure becomes the new set-point which the switch senses. Accordingly, $$P_{s2t} = [P_{s1}/(1-\%V)](T_2/T_1) \quad (8)$$

Substituting equation 8 into equation 4 yields $$X_s = \frac{[P_t - [P_{s1}/(1 - \% V)][T_2/T_1]](A_p)}{K_s} \quad (9)$$

Solving equation 9 for $(P_t)$ yields $$P_t = (X_s K_s/A_p) + [P_{s1}/(1-\%V)](T_2/T_1) \quad (10)$$

Equation 10 defines the tire pressure which is required to deflect the diaphragm to the set-point deflection at $X_s$ which is the point where the switch contacts close. Equation 10 can be rewritten by observation of the fact that, for a calibrated switch, $X_s K_s/A_p$ is constant, ($C_1$), $P_{s1}/(1-\%V)$ is constant ($C_2$) and $T_1$ is constant ($C_3$). Constants $C_1$, $C_2$ and $C_3$ are defined after the switch has been calibrated at $T_1$ and $P_{s1}$. Defining a fourth constant ($C_4$) as being equal to $C_2/C_3$, $P_t$ can be rewritten as $$P_t = C_1 + (C_4)(T_2) \quad (11)$$

Equation 11 is the equation for a line with an offset of $C_1$ and a slope $C_4$. Equations 10 and 11 are the same and can be plotted to show the effect of temperature change on the switch point for a sealed cavity switch which is not 100% temperature compensated. It must be remembered, however, that these results are based upon the ideal gas law equation and some deviation can be expected due to the nonidealness of pressurized air.

EXAMPLE

Figure 7:
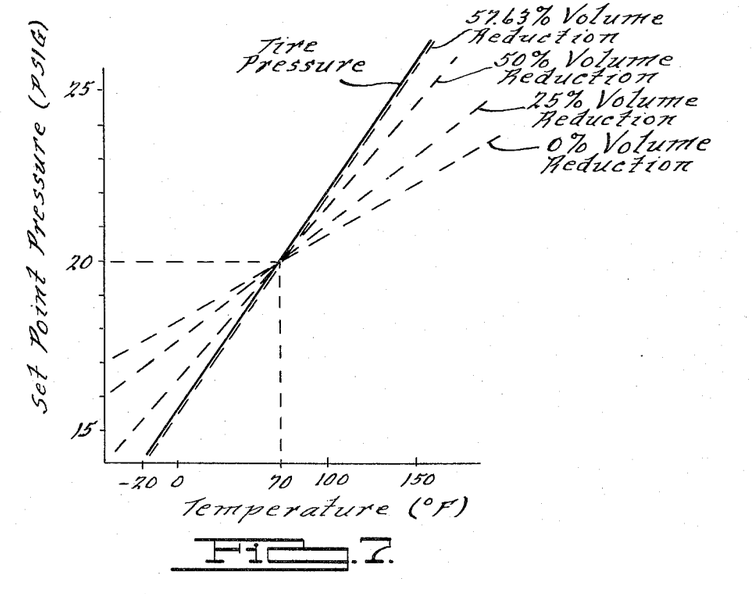
FIG. 7, is a graphical presentation of set point pressure versus temperature over a range of percentage volume reductions as well as the tire pressure characteristics for the mathematical model of FIG. 5.

Referring to FIG. 7, an example is given employing actual test data for the constant values in equation 10. It is to be understood that the following constants and data are intended for example only and are not to be construed as limiting. As an example we can use
$K_s = 312.5$ lbs./in.
$A_p = 0.172$ sq. in.
$P_{s1} = 14.7$ p.s.i.a.
$T_1 = \zeta°$ F. (530° R.)
%V = variable %
$T_2$ = variable °R.
$P_t$ = variable p.s.i.a.

$X_s$ is also variable depending upon the chosen set pressure at 70° F. (see equation 5) and will be expressed in inches. The switch point deflection $X_s$ can be calculated from equation 5 after the set-point pressure at 70° F. has been chosen. Assuming $P_t$ is equal to 20.0 p.s.i.g. (34.7 p.s.i.a.) at 70° F., the following chart can be established;

| %V   | $X_s$ (inches) |
|------|----------------|
| 0    | 0.011          |
| 25   | 0.008          |
| 50   | 0.003          |
| 57.6 | 0.000          |

By solving equation 10 for various values of percent volume and temperature $T_2$ the graph of FIG. 7 can be generated.

In this particular example, it was found that a volume reduction of 57.6% was optimum and resulted in complete temperature compensation. Upon studying the model hereinabove, it will be obvious that in a perfect temperature compensation condition, the spring can be eliminated and the total compensation achieved solely due to the action of the sealed cavity.

Figure 3:
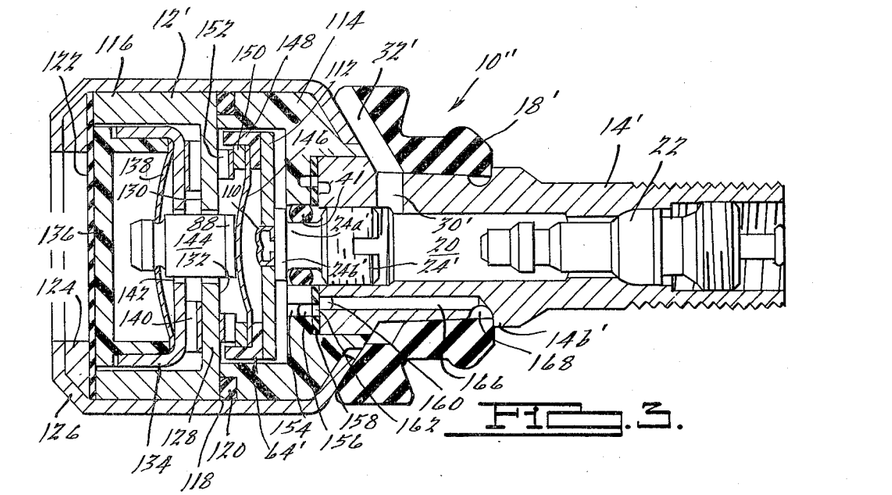
FIG. 3, is a cross sectional view of another alternative embodiment of the valve/switch of FIG. 1.
Figure 4:
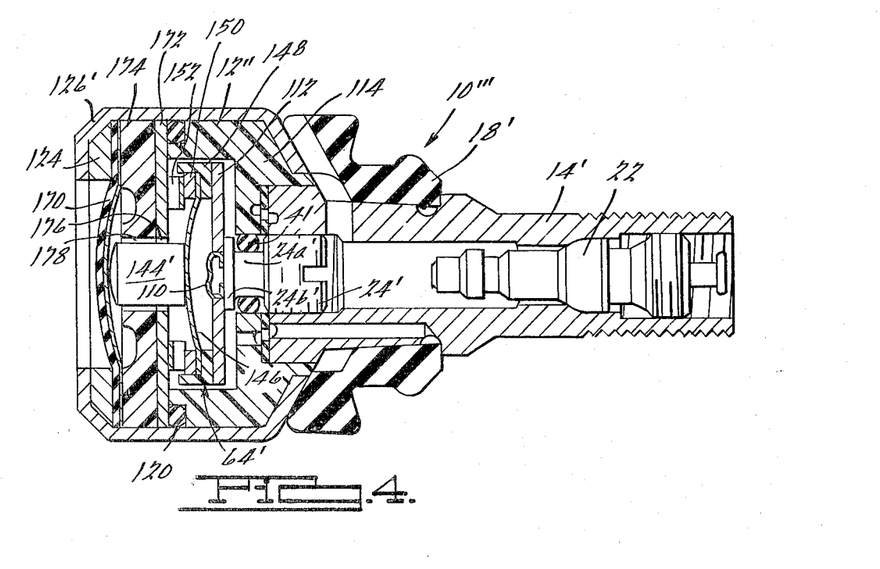
FIG. 4, is a cross sectional view of still another alternative embodiment of the valve/switch of FIG. 1.

Referring to FIGS. 3 and 4, an alternative species of the present invention is illustrated in two embodiments. The embodiments of FIGS. 3 and 4 substitute a bimetallic element for the sealed chamber of the embodiments of FIGS. 1 and 2. The embodiments of FIGS. 3 and 4 are also fully temperature compensated and provides a set-point which is independent of temperature, resulting in a switch which responds only to a change in the total mass of air enclosed by the tire.

Referring to FIG. 3, an alternative embodiment of a valve-switch 10'' is illustrated comprising a valve-switch portion 12' and a valve stem portion 14'. Valve-switch 10'' is adapted to be insulatively mounted to a conventional wheel and pneumatic tire assembly (not illustrated) through an intermediate grommet 18' as was described in the discussion of FIG. 1. A valve core assembly 22 is disposed within a bore 20 defined by valve stem portion 14'. One end of bore 20 is closed by a set-point adjustment screw 24'. The end of bore 20 closed by adjustment screw 24' communicates with the tire through a radially disposed inlet bore 30' and a relief 32' in grommet 18'. Thus, the air enters the tire and is pressurized, being checked from escape through bore 20 in the same as the embodiment of FIG. 1. Adjustment screw 24' has an area of reduced diameter 24a' extending leftwardly therefrom which terminates in a switch support platform portion 24b'. An electrical switch contact 110 and an annular metal washer 112 abut the left-handmost surface of switch support platform portion 24b' and form part of a switch assembly 64'.

Switch housing portion 12' comprises an insulating sleeve 114 constructed of plastic or the like and a metal electrically conducting spacer 116. Sleeve 114 and spacer 116 are coaxially aligned with valve stem portion 14' and define a switch cavity which is closed at its right-handmost end by adjustment screw 24' and o-ring 41 which sealingly interconnects area of reduced diameter 24a' and insulating sleeve 114. Sleeve 114 is molded upon the left-handmost end of valve stem portion 14' and is supported thereby. The left-handmost surface of insulating sleeve 114 which abuts right-handmost surface of spacer 116 has a relief 118 within which is disposed a o-ring seal 120. The left-handmost end of the switch cavity is sealed by a rubber diaphragm 122 which is supported around the periphery thereof by a metal spacer 124. A metal retention member 126 encloses switch housing portion 112 and clampingly embraces spacer 124, diaphragm 122, spacer 116 and insulating sleeve 114, securing them in the position illustrated.

Spacer 116 has an integral inwardly projecting annular portion 128 which defines a leftward facing land 130 and a rightward facing land 132. A plastic retaining cup 134 is disposed within the switch housing between land 130 and diaphragm 122 which opens leftwardly to receive a plunger 136 therein. Retaining cup 134 and plunger 136 are bonded together in the illustrated position such as by ultrasonic welding, adhesive or the like. The peripheral surface of a bimetallic element 138 disposed within retaining cup 134 is secured in the illustrated position by plunger 136. The left-handmost surface of plunger 136 abuts the right-handmost surface of diaphragm 122 and a wave spring 140 disposed within the switch cavity, abuts land 130 and bears against the right-handmost surface of retaining cup 134 urging retaining cup 134, bimetallic element 138 and plunger 136 leftwardly against the influence of diaphragm 122. Retaining cup 134 has an axially aligned aperture 142 disposed therein through which passes a switch actuating piston 144. Piston 144 has a necked portion projecting leftwardly therefrom which passes through an axially aligned aperture in bimetallic element 138. Piston 144 is supported by bimetallic element 138 and is displaceable therewith. Insulating disc 88 is affixed to the right-handmost surface of piston 144 which abuts a second contact 146 which is disposed within the switch cavity between land 132 and washer 112. Contact 146 has a convex cross sectional area towards piston 144 and is secured around the periphery thereof by an insulating spacer guide 148 disposed between contact 146 and washer 112 as well as axially between contact 146 and insulating sleeve 114. An annular clamping member 150 constructed of conducting material clamps contact 146 with spacer guide 148 under the influence of a wave spring 152 which abuts land 132 and urges the assembly of clamping member 150, contact 146 and spacer guide 148 rightwardly against washer 112. Thus, clamping member 150, contact 146, spacer guide 148, washer 112 and contact 110 are displaced axially as a unit when adjustment screw 24' is repositioned. Likewise, plunger 136, retaining cup 134, bimetallic element 138, piston 144 and protecting disc 88 all move as a unit under the influence of air pressure bearing against the left-handmost surface of diaphragm 122. Because of its curved section, contact 146 will exhibit a snap-action when piston 144 attempts to displace it to the right under the influence of fluid pressure within the tire. This action is the same as that described in the switch employed in the embodiments illustrated in FIGS. 1 and 2.

The switch cavity in the embodiment of FIG. 3 is vented to the atmosphere. This is accomplished by an axially aligned bore 154 which interconnects the switch cavity with an annular recess 156 formed in the right-hand face of insulating sleeve 114 which abuts the left-handmost face or surface of valve stem portion 14', a rubber seal 158 being disposed therebetween. The left-handmost face of valve stem portion 14' also has an annular recess 160 formed therein which is in substantial registery with recess 156 through aligned apertures 162 in rubber seal 158. A second axially aligned bore 166 in valve stem portion 14' interconnects annular recess 160 with a radially outwardly opening recess 168 formed in the outside surface of valve stem portion 14'. Although a portion of grommet 18' overlays recess 168, there is a leak path between grommet 18' and an area of increased diameter 14b' of valve stem portion 14'. Grommet 18' is configured to overlay recess 168 to block the entry of foreign particles or contaminants therein which may interfere with the operation of valve-switch 10''.

Valve-switch 10'' operates as follows. At fixed temperatures, bimetallic element 138 retains a fixed geometrical configuration and supports piston 144 to move axially with plunger 136 and retaining cup 134. When the air pressure within the tire with which valve-switch 10'' is being applied exceeds the set-point pressure, the force against diaphragm 122 displaces piston 144 to the right, compressing wave spring 140 and moving contact 146 to the right towards contact 110; when contact 146 abuts contact 110, an electrical circuit or path is completed comprising valve stem portion 14', adjustment screw 24', contact 110, contact 146, clamping member 150, wave spring 152, spacer 116 and retention member 126. When the air pressure within the tire falls below the set-point pressure, contact 146 moves back towards the left and breaks the electrical path. The set-point pressure can be adjusted manually by repositioning set screw 24' as described in the discussion of FIG. 1. When plunger 136 is displaced inwardly or outwardly, the air within the switch cavity displaced thereby is forced into or out of the cavity depending upon the direction of displacement of plunger 136 through a path defined by bore 154, annular recess 156, aperture 162, annular recess 160, bore 166 and recess 168.

The temperature compensation of valve-switch 10'' is accomplished through the use of bimetallic element 138 which operates to selectively axially displace piston 144 with respect to plunger 136 and retaining cup 134 as a function of temperature. The bimetal material in bimetallic element 138 is arranged to displace piston 144 to the left as illustrated in FIG. 3 with increasing temperature and conversely to displace piston 144 to the right with decreasing temperature.

Referring to FIG. 4, a fourth embodiment of a valve-switch 10''' is illustrated. The principle of operation of the embodiments in FIG. 3 and FIG. 4 are the same, the only difference being that the bimetallic element 138 and diaphragm 122 in FIG. 3 is consolidated in FIG. 4 in a rubber covered bimetallic diaphragm 170 which provides both functions. Spring 152 abuts the right-handmost surface of a conductive washer 172 which is disposed coaxially rightwardly of a plastic spacer 174. A metal retention member 126' encloses switch housing portion 12'' and embracingly retains insulated sleeve 114, washer 172, spacer 174, bimetal diaphragm 170 and spacer 124 in their illustrated positions. A piston 144', which is disposed coaxially within the switch cavity, passes through registering apertures 176 and 178 in washer 172 and spacer 174 respectively. The left-handmost surface of piston 144' abuts diaphragm 170 and the right-handmost surface abuts switch contact 146.

Although the embodiments described in the Detailed Description of the Invention illustrate temperature compensated fill valve-pressure switches which close a set of electrical contacts when the pressure in a container such as a pneumatic tire exceeds a set-point pressure and opens those contacts when the pressure in the tire falls below the set-point pressure, it is to be understood that reversal of this logic could be easily accomplished by one shilled in the art in light of the present specification. Additionally, although one set of contacts was illustrated in any given embodiment, it is also contemplated that additional contacts could be provided to perform multiple functions. Additionally, the illustrative low tire monitor described in FIG. 1 could easily be extended upon to include an external temperature transducer which, for example, could be embedded in the core of the tire associated with the valve-switch and the transducer electrically interconnected in parallel with the contacts thereby providing a redundant or dual function. An example of such an application would be a tire pressure monitor which operated to detect both a low tire pressure condition as well as an overload or excess tire pressure condition simultaneously. It is to be understood, therefore, that the invention has been described with reference to specific embodiments which provide the features and advantages previously described, and that such specific embodiments are susceptible for modification, as will be apparent to those skilled in the art. Another example of such modifications would be to construct the valve stem portion 14 of an insulative material such as plastic and to plate the outer surface as well as the inner surface of the bore passing therethrough the conductive material. The conductive material could be electrically connected to the switch contacts and employed as terminals for interfacing with a tire pressure monitor. This would eliminate the need for grounding the switch with implications obvious to those skilled in the art. Accordingly, the foregoing description is not to be construed in a limiting sense.

What is claimed is:

1. A device for monitoring fluid pressure within a container, the device comprising:
   a body adapted to be positioned adjacent a wall of the container;
   switch means disposed within said body, and operative to monitor the fluid pressure within the container and shift from a first state to a second state when the fluid pressure falls below a selected level; and
   means operative to effect a preselectable temperature compensation characteristic for said device, said compensation means including a sealed prepressurized cavity defined entirely by said body and a compliant wall member operative to substantially vary the volume of said cavity as a function of cavity pressure and container fluid pressure, and engaging said switch means to vary said selected level.

2. The device of claim 1, further comprising adjustment means disposed within said body and operative to manually vary said selected level.

3. The device of claim 1, wherein said switch means comprises an electrical switch having at least two contacts and a terminal associated with each said contact.

4. The device of claim 3, wherein at least one of said contacts is displaceable with respect to another said contact as a function of fluid pressure between a first contacting position and a second non-contacting position.

5. The device of claim 4, wherein said contacting and non-contacting positions are respectively associated with said first and second states.

6. The device of claim 4, wherein said contacting and non-contacting positions are respectively associated with said second and first states.

7. The device of claim 1, wherein said cavity volume decreases with increasing fluid pressure.

8. The device of claim 1, wherein said switch means disposed within said cavity.

9. The device of claim 1, wherein said cavity is pressurized at a relatively low pressure.

10. The device of claim 4, wherein said compliant wall member operates to selectively reposition said displaceable contact.

11. A device for pressurizing a container and monitoring fluid pressure levels within the container, the device comprising:
    a body defining an inlet passage and adapted to be positioned in an aperture in a wall of the container;
    valve means removably disposed within said passage and operative to selectively pass fluid therethrough;
    switch means disposed within said body, and operative to monitor the fluid pressure within the container and to shift from a first state to a second state when the fluid pressure falls below a selected level;
    compensation means operative to vary said selected level as a function of fluid temperature; and
    adjustment means disposed within said body and accessible through said inlet passage when said device is installed within an associated container, said adjustment means being operable to manually vary said selected level.

12. The device of claim 11, wherein said adjustment means is disposed within said inlet passage intermediate said valve means and switch means.

13. The device of claim 11, wherein said switch means comprises an electrical switch having at least two contacts and a terminal associated with each said contact.

14. The device of claim 13, wherein at least one of said contacts is displaceable with respect to another said contact as a function of fluid pressure between a first contacting position and a second non-contacting position.

15. The device of claim 14, wherein said contacting and non-contacting positions are respectively associated with said first and second states.

16. The device of claim 14, wherein said contacting and non-contacting positions are respectively associated with said second and first states.

17. The device of claim 13, wherein the portion of said body which defines said inlet passage comprises a valve stem constructed of electrically conductive material comprising at least one of said terminals.

18. The device of claim 17, wherein said container is defined by a wheel and pneumatic tire, said body being adapted to be insulatively mounted on an inside wall of said wheel with the valve stem projecting radially outwardly therethrough, said body further comprising a switch housing constructed of electrically conductive material and comprising a second of said terminals, said housing being adapted for electrical connection with said wheel.

19. The device of claim 11, wherein said compensation means comprises a substantially closed chamber disposed within said body and having a volume which varies as a function of the fluid pressure within said container.

20. The device of claim 19, wherein said chamber volume decreases with increasing fluid pressure.

21. The device of claim 19, wherein said switch means is disposed within said chamber.

22. The device of claim 11, wherein said compensation means comprises a bimetallic element.

23. A device for pressurizing a container and monitoring fluid pressure levels within said container, the device comprising:
   a body defining a switch portion adapted for insulative mounting within said container and a valve stem portion, projecting outwardly from said switch portion, said valve stem portion defining an inlet passage;
   a check valve removably disposed within said inlet passage;
   switch means disposed within said switch portion and operative to shift between a first state and a second state as a function of fluid pressure within said container, said switch means comprising first and second terminals which are electrically open in said first state and electrically connected in said second state;
   compensation means operative to vary the pressure at which said switch means shifts between states as a function of fluid temperature; and
   adjustment means disposed within said valve stem portion and accessible through said inlet passage when said device is installed within an associated container, said adjustment means being operable to manually vary said switch means shift pressure.

24. The device of claim 23, wherein said valve stem portion is electrically connected to said container in one of said states and electrically insulated from said container in the other of said states.

25. A fill valve-temperature commpensated pressure device including a switch in combination with a pneumatic tire and associated mating wheel, comprising:
   a body insulatively mounted within said wheel and including a valve stem portion projecting outwardly therefrom;
   a check valve removably disposed within an inlet passage defined by said valve stem portion operative to admit air into said tire and prevent the escape of air from said tire;
   a switch disposed within said body and comprising a pair of electrical contacts which open and close as a function of the air pressure within said tire;
   temperature compensation means disposed within said body and operative to displace at least one of said contacts with respect to another said contact as a function of air temperature within said tire to determine a transition pressure at which said contacts open and close, said transition pressure varying as a function of air temperature; and
   set-point adjustment means disposed within said valve stem portion and accessible through said inlet passage when said valve-switch device is installed within an associated pneumatic tire and wheel, said adjustment means being operable to manually vary said transition pressure.

26. The combination of claim 25, wherein said set-point adjustment means is threadably disposed within said valve stem portion intermediate said check valve and switch.

27. The combination of claim 25, wherein said temperature compensation means comprises a substantially closed chamber having a volume which varies as a function of the air pressure within the tire.

28. The combination of claim 27, wherein said chamber volume decreases with increasing air pressure.

29. The combination of claim 27, wherein said switch is disposed within said chamber.

30. The combination of claim 25, wherein said temperature compensation means comprises a bimetallic element.

31. The combination of claim 25, wherein said temperature compensation means is operative to effect a preselectable temperature compensation characteristic for said valve-switch, said compensation means including a sealed prepressurized cavity disposed within said body partially defined by a compliant wall member operative to substantially vary the volume of said cavity as a function of cavity pressure and pneumatic tire pressure, and engaging said switch to vary said transition pressure.

* * * * *